April 18, 1950     R. B. GREENE     2,504,517
PRODUCTION OF CYCLOHEXANOLS
Filed March 22, 1946
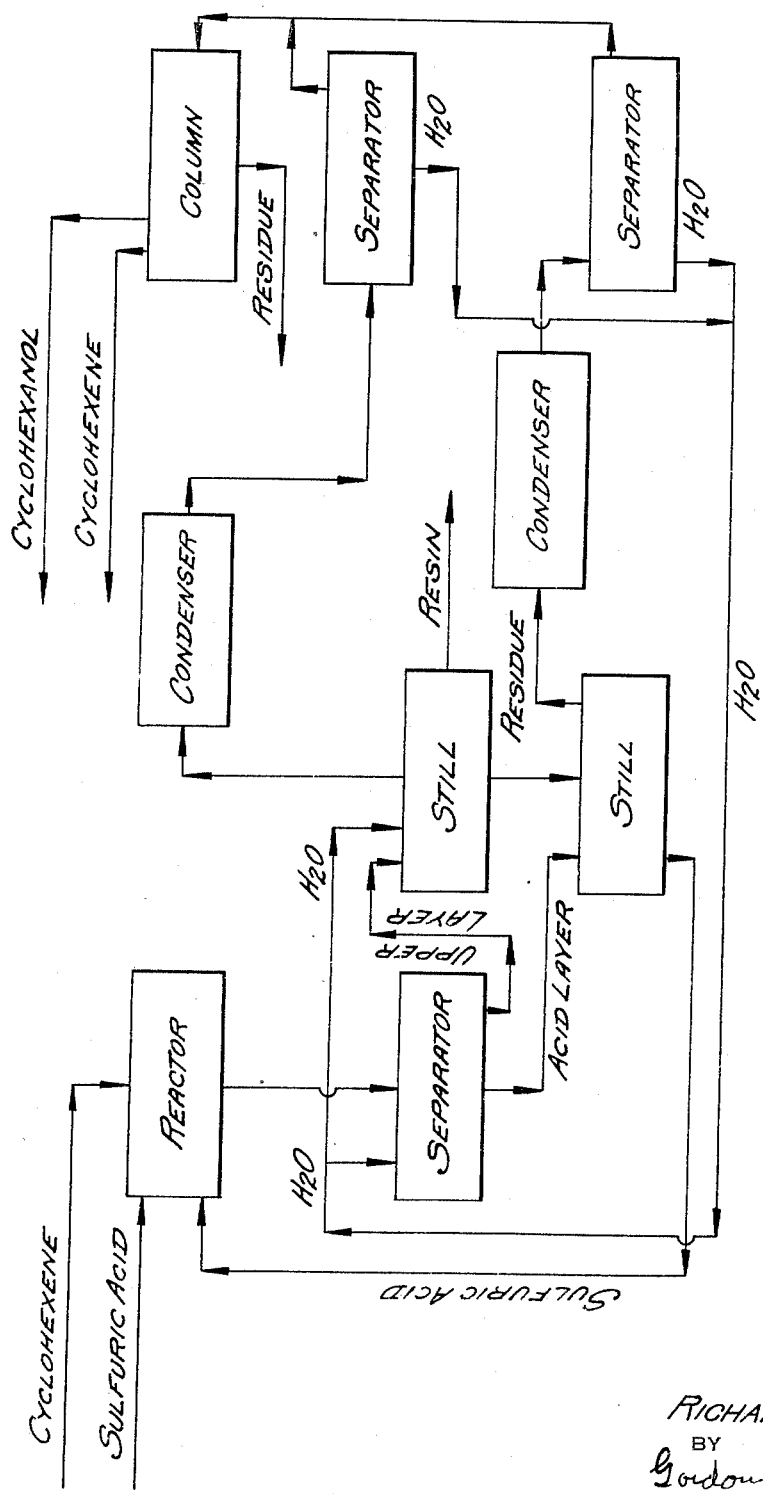
INVENTOR
RICHARD B. GREENE
BY
Gordon A. Wilkins
ATTORNEY Patented Apr. 18, 1950

2,504,517

UNITED STATES PATENT OFFICE 2,504,517

PRODUCTION OF CYCLOHEXANOLS

Richard B. Greene, Cheltenham Township, Montgomery County, Pa., assignor to Allied Chemical & Dye Corporation, New York, N. Y., a corporation of New York Application March 22, 1946, Serial No. 656,473

2 Claims. (Cl. 260—631)

This invention relates to the production of cyclohexanols and more particularly to the manufacture of cyclohexanols from cyclohexene and sulfuric acid.

Heretofore it has been proposed to manufacture cyclohexanol by hydration of cyclohexene with mineral acids such as sulfuric acid. For example, British Patent 339,592 discloses adding cyclohexene dropwise to 80% sulfuric acid while cooling the reaction mixture by solid carbon dioxide, then stirring the mixture at room temperature, pouring it into ice, neutralizing the acid with alkali, and recovering cyclohexanol from the mixture by distillation. In order to provide an economical process, it is necessary that large losses of cyclohexene by polymerization be avoided, that the cyclohexyl acid sulfate formed during the reaction be converted either to recoverable cyclohexanol or cyclohexene and that the sulfuric acid be recovered for reuse in the process. Neutralization of the reaction mixture with alkalies, such as sodium hydroxide, is unsatisfactory, because the sodium salt of cyclohexyl acid sulfate is relatively stable and causes formation of emulsions and foaming of the reaction mixture, thus hindering recovery of the cyclohexanol. Further neutralization of the reaction mixture involves formation of alkali salts of sulfuric acid with consequent loss of acid. Direct distillation of the reaction mixture without neutralization results in substantial reconversion of cyclohexanol to cyclohexene by dehydration.

It is an object of this invention to provide an improved process for the manufacture of cyclohexanol and its methyl homologs from cyclohexene and its methyl homologs. The terms "cyclohexanols" and "cyclohexenes" are employed hereinafter to include cyclohexanol, cyclohexene and their methyl homologs.

It is a further object of the invention to provide a process for the production of high yields of cyclohexanol from cyclohexene and sulfuric acid without incurring large losses of cyclohexene by polymerization, undue reconversion of the cyclohexanol to cyclohexene, and with a minimum consumption of sulfuric acid. Other objects and advantages will appear hereinafter.

In accordance with the invention, cyclohexene is reacted with sulfuric acid, sufficient water is mixed with the reaction mixture to promote stratification thereof, and the resultant mixture is permitted to separate into layers, the upper of which contains most of the cyclohexanol and the cyclohexyl acid sulfate formed during the reaction and the unreacted cyclohexene, and the lower of which contains unreacted sulfuric acid. The upper layer is distilled in the presence of water to decompose the cyclohexyl acid sulfate to form cyclohexanol, some cyclohexene and sulfuric acid, and the lower layer is distilled to reconcentrate the acid for reaction with an additional amount of cyclohexene. The water present in the distillate contains some dissolved cyclohexanol and is preferably employed for dilution and stratification of the reaction product of an additional amount of cyclohexene and sulfuric acid and for carrying out the distillation of the upper layer of such reaction product; this recycling of the water minimizes losses of cyclohexanol. In order to react an optimum proportion of the cyclohexene with the sulfuric acid with minimum loss of cyclohexene by evaporation or polymerization, sulfuric acid of from 46% to 81% concentration is preferably employed. Acid of such strength may more readily be reconcentrated for reuse in the process than higher strength acid.

A preferred procedure for carrying out the invention involves reacting cyclohexene with at least 2.9 parts by weight of sulfuric acid of from 65% to 70% concentration for each part by weight of cyclohexene for from 45 to 75 minutes at a temperature of from 40° to 60° C., diluting the resultant reaction mixture with not more than 10, preferably from 1 to 3 volumes of water for each volume of the sulfuric acid utilized, permitting the resultant mixture to separate into layers, steam distilling the upper layer containing the unreacted cyclohexene, cyclohexanol and cyclohexyl acid sulfate, thereby decomposing the sulfate to form cyclohexanol, cyclohexene and sulfuric acid, and recovering the cyclohexanol and cyclohexene as distillate, adding the acid residue of this distillation to the lower layer, distilling the resultant mixture to reconcentrate the sulfuric acid to within the range of 65% to 70% strength, reacting the reconcentrated acid and additional sulfuric acid with recovered cyclohexene and additional cyclohexene in a subsequent run, and employing the water obtained as distillate during said distillations for dilution and stratification of the reaction mixture of a subsequent run and for distilling the upper layer resulting from such stratification. If desired, the reconcentrated acid may be filtered or settled and decanted before reuse to remove solid impurities. The above procedures are applicable to the preparation of methyl cyclohexanols from the corresponding methyl cyclohexenes.

The production of cyclohexanols in accordance with the invention results in high yields of cyclohexanols and only small losses of cyclohexenes by polymerization. Not more than about from 5% to 10% of the cyclohexene is lost through polymerization, more than 75% of the cyclohexene is converted to cyclohexanol, and the remainder is recovered as cyclohexene and may be recycled in the process. Thus, the invention involves conversion of from 90% to 95% of the total reacted cyclohexene to cyclohexanol with loss of not more than 5% to 10% as undesirable polymerization products.

For purposes of economy, it is desirable to employ no more sulfuric acid during the cyclohexene-sulfuric acid reaction step than necessary for optimum yields of cyclohexanol and to utilize no more water for treatment of the reaction product than is necessary for effective separation of the layers and satisfactory distillation of the upper layer. Ordinarily a weight ratio of sulfuric acid (calculated as 100% $H_2SO_4$) to cyclohexene of 1.9:1 produces as high yields of cyclohexanol as larger amounts of acid, and accordingly it is preferred that the acid-cyclohexene ratio be at least and not exceed approximately 1.9:1. The reaction mixture should be diluted with sufficient water to afford effective separation of the reaction product into layers, for example a volume of water approximately equal to the volume of 65% to 70% sulfuric acid charged into the reactor. If more concentrated acid is employed, a larger amount of water may be necessary to promote rapid stratification. The volume of water added to the upper layer after separation should be sufficient to effect steam distillation of this layer. Ordinarily the amount of water should fall within the range of 1.5 to 2.5 volumes and preferably should not exceed 2 volumes for the equivalent of each volume of 65% to 70% sulfuric acid charged into the reactor. Distillation of the upper layer may advantageously be continued until 90% of the water added is driven off as distillate. Larger amounts of water and acid may be employed but increase the reagent and distillation costs, thus increasing the cost of the cyclohexanol product.

The cyclohexenes employed in the process may be substantially pure or may contain substantial amounts of other materials; for example, hydrocarbon mixtures containing 10% or more of cyclohexene, the remainder being aromatic and paraffin hydrocarbons, may be utilized. Such mixtures may be derived from cracking operations or pyrolysis of petroleum fractions.

The accompanying drawing is a flow sheet illustrating diagrammatically an arrangement of apparatus which may be employed for carrying out the invention.

In the drawing, the reactor in which the cyclohexene and sulfuric acid are reacted is preferably equipped with cooling coils or a cooling jacket (not shown) in order to extract heat liberated during the reaction and maintain the reaction mixture at the desired temperature. The separators, stills, condensers and fractionating column may be apparatus of well known type and require no further description. The apparatus elements with which the sulfuric acid comes into contact should be made of materials resistant to corrosion by this reagent. Such materials are well known in the art.

The following examples further illustrate the invention:

Example 1.—100 parts by weight of cyclohexene and 290 parts by weight of 67% sulfuric acid were added to the reactor, the mixture reacted at 50° C. for one hour, and the reaction mixture was then discharged into a separator. A volume of water equal to the original volume of 67% sulfuric acid employed was then added to the reaction mixture and the mixture separated into two layers, the lower of which contained aqueous sulfuric acid and the upper of which contained cyclohexanol, cyclohexyl acid sulfate, unreacted cyclohexene, and polymerized cyclohexene. The upper layer was charged into a still equipped with closed steam heating coils, together with a volume of water equal to twice the volume of the 67% sulfuric acid originally employed, and the resultant mixture was distilled until distillation of cyclohexanol practically ceased, at which time 85% by volume of the still charge had been removed as distillate and the volume of the residue was about 20% of the volume of water added to the still. During the distillation the cyclohexyl acid sulfate was hydrolyzed, cyclohexanol and some cyclohexene being formed. The distillate was condensed, the condensate was separated into layers, the water layer was separated from the layer containing cyclohexanol and cyclohexene and the latter layer was fractionated. Cyclohexanol of high purity and cyclohexene for reuse in the process were recovered. The residue of distillation obtained during distillation of the upper layer contained aqueous dilute sulfuric acid, resinous polymerized cyclohexene and some cyclohexanol. The aqueous acid was separated from the resin and added to the lower layer and the resultant mixture was distilled until the acid was reconcentrated to about 67% strength. The distillate thus obtained was separated into a water layer and a cyclohexanol layer and the cyclohexanol was fractionated along with the cyclohexanol-cyclohexene distillate layer as indicated in the drawing.

The above run was repeated three additional times utilizing for each run the cyclohexene and the reconcentrated sulfuric acid recovered during the preceding run together with make-up cyclohexene and a small amount (2%–3%) of make-up acid. The aqueous portion of the distillates obtained during each run was employed, together with some make-up water for dilution of the reaction mixture and steam distillation of the upper layer of the succeeding run.

The yields of recovered cyclohexanol, recovered cyclohexene and unrecovered cyclohexene for each run are tabulated below. The percentages of cyclohexanol are based on the theoretical yield of cyclohexanol from the cyclohexene charged into the reactor, and the percentages of cyclohexene are based on the amount of cyclohexene charged into the reactor.

| Run | Cyclohexanol recovered | Cyclohexene recovered as such | Cyclohexene not recovered as such or as Cyclohexanol |
|---|---|---|---|
| | Per cent | Per cent | Per cent |
| 1 | 65 | 14.9 | 20.1 |
| 2 | 72.7 | 16.8 | 10.5 |
| 3 | 75.2 | 19.3 | 5.5 |
| 4 | 77.2 | 17.4 | 5.4 |

Most of the cyclohexene not recovered as such or as cyclohexanol in Run 1 and about half of that in Run 2 was represented by the dissolved cyclohexanol in the water and was recovered when the water was recycled in succeeding runs, only about 5% of the cyclohexene being lost by polymerization. The cyclohexene not recovered as such or as cyclohexanol in Runs 3 and 4 was lost chiefly by polymerization, the polymers being obtained as a resinous residue during distillation of the upper layer. It will be observed that the yield of cyclohexanol as the runs were repeated, recycling the water, rose from 65% to more than 75%, and most of the remainder of the cyclohexene was recovered as such for reuse in the process, less than 10% being lost through polymerization, so that the total yield of cyclohexanol, based on the cyclohexene, was more than 90%.

*Example 2.*—100 parts by weight of cyclohexene and 580 parts by weight of 67.2% sulfuric acid were reacted together at a temperature of approximately 50° C. for one hour and the reaction mixture was then diluted with a volume of water equal to the volume of 67.2% sulfuric acid. The diluted mixture was separated into layers and the upper layer containing cyclohexanol, cyclohexyl acid sulfate and cyclohexene was separated from the lower layer and steam distilled until cyclohexanol ceased to come over with the distillate. The residue of distillation was added to the lower layer and the resultant mixture was distilled until cyclohexanol ceased to be distilled over. The total amount of cyclohexanol distilled over, including that dissolved in the aqueous portion of the distillate, amounted to 82.8% of that theoretically obtainable from the cyclohexene utilized. 12.6% of the cyclohexene employed was recovered as such.

For purposes of comparison, the same procedure and materials were employed as in Example 2, except that the diluted reaction mixture was steam distilled directly, i. e. without separating the lower acid layer from the upper layer containing cyclohexanol. The yields obtained by the above procedures are tabulated below:

|  | Yield of Cyclohexanol | Cyclohexene recovered as such |
| --- | --- | --- |
|  | Per cent | Per cent |
| Example 2 | 82.8 | 12.6 |
| Comparative run | 53.6 | 44.8 |

The reduced yield of cyclohexanol in the comparative run may be attributed to dehydration of cyclohexanol by sulfuric acid during the distillation operation.

Thus it will be seen the invention provides a novel process for the production of cyclohexanols from cyclohexenes and sulfuric acid, and recovery of the cyclohexanols by simple stratification and distillation procedure. High yields of cyclohexanol are obtained, from 90% to 95% of the reacted cyclohexene being converted to cyclohexanol with loss of less than 10% of the cyclohexene by polymerization. Further, the invention avoids the difficulties inherent in cyclohexanol recovery procedures, such as neutralization of the reaction mixture and salting out operations to separate the cyclohexanol from other reaction products. The cyclohexanol obtained in accordance with the invention is of higher purity than that produced by hydrogenation of phenol.

Since certain changes may be made without departing from the scope of the invention, it is intended that the above description shall be interpreted as illustrative and not in a limiting sense. For instance, while it is preferred to employ sulfuric acid of from 65% to 70% concentration and a reaction temperature of from 40° to 60° C., since under these conditions the loss of cyclohexene by polymerization and evaporation from the reaction mixture is small, higher strength acids may be employed provided lower reaction temperatures are maintained, and weaker acids may be utilized provided higher reaction temperatures are maintained. Use of high strength, e. g. 96%, sulfuric acid necessitates maintenance of reaction temperatures below 10° C., and hence necessitates drastic refrigeration of the reaction mixture, entails greater expense in reconcentrating the acid for reuse in the process, and tends to promote greater loss of cyclohexene by polymerization than acids of from 65% to 70% concentration. Use of weaker acids requires maintenance of reaction temperatures above 40° to 60° C. and tends to increase loss of cyclohexene by evaporation.

I claim:

1. A process for the production of cyclohexanol which comprises reacting cyclohexene with sulfuric acid of from 65% to 70% concentration for from 45 to 75 minutes under temperature conditions within the range of from 40° to 60° C., diluting the resultant reaction mixture with sufficient water to cause the mixture to separate into layers upon standing but with not more than 3 volumes of water for each volume of sulfuric acid employed, separating the diluted mixture into layers, steam distilling the upper layer to hydrolyze the cyclohexyl acid sulfate therein and recover cyclohexanol and cyclohexene therefrom, leaving an aqueous residue of distillation containing sulfuric acid, mixing said aqueous residue of distillation with the lower layer, distilling the resultant mixture to reconcentrate the sulfuric acid to within the range of 65% to 70% strength, reacting the reconcentrated acid with cyclohexene, utilizing a portion of the water distilled off during said distillation steps for diluting and stratifying a reaction mixture formed by reacting cyclohexene with sulfuric acid, and steam distilling the upper layer obtained from said last-named reaction mixture in the presence of the remainder of the water distilled off during distillation of said first-named upper and lower layers.

2. A process for the manufacture of cyclohexanol which comprises reacting cyclohexene with sulfuric acid of a concentration of from 65% to 70% in amount of approximately 1.9 parts by weight (calculated as 100% $H_2SO_4$) for each part by weight of the cyclohexene under temperature conditions within the range of from 40° to 60° C. for from 45 to 75 minutes, adding to the resultant reaction mixture approximately one volume of water for each volume of the sulfuric acid employed in said reaction, permitting the resultant mixture to separate into a lower aqueous layer containing dilute sulfuric acid and an upper layer containing cyclohexanol, cyclohexyl acid sulfate and cyclohexene, adding to said last-named layer an amount of water equal approximately to twice the volume of sulfuric acid employed in said reaction, steam distilling the resultant mixture until about 90% of the water added is driven off as distillate, separating polymerized material from the distillation residue, adding the aqueous portion of said residue of distillation to said lower layer, distilling the resultant mixture until sulfuric acid of from 65% to 70% concentration is obtained as residue, reacting said sulfuric acid with cyclohexene, utilizing the water recovered during said distillation steps for diluting and stratifying the resultant reaction mixture and for steam distilling the upper layer obtained from said last-named reaction mixture.

RICHARD B. GREENE.

REFERENCES CITED

The following references are of record in the file of this patent:

UNITED STATES PATENTS

| Number | Name | Date |
|---|---|---|
| 2,006,942 | Clark | July 2, 1935 |
| 2,244,849 | Olin | June 10, 1941 |
| 2,345,573 | Bruson | Apr. 4, 1944 |
| 2,414,646 | Hepp | Jan. 21, 1947 |